United States Patent [19]

Carnahan et al.

[11] 4,256,587

[45] Mar. 17, 1981

[54] SILICEOUS ADSORBENT FOR HEAVY METALS

[75] Inventors: Thomas G. Carnahan, Sparks; Charles M. Flynn, Jr., Reno, both of Nev.

[73] Assignee: The United States of America as represented by the Secretary of the Interior, Washington, D.C.

[21] Appl. No.: 97,756

[22] Filed: Nov. 27, 1979

[51] Int. Cl.³ ............................ C02F 1/42; C02F 1/62
[52] U.S. Cl. .................................. 210/670; 210/674; 210/688
[58] Field of Search .................... 210/30 R, 32, 38 B; 252/449, 454; 423/326, 328, 331, 332

[56] References Cited

U.S. PATENT DOCUMENTS

| | | | |
|---|---|---|---|
| 2,640,756 | 6/1953 | Wills | 210/38 B |
| 3,374,182 | 3/1968 | Young | 423/328 |
| 3,882,018 | 5/1975 | Depree | 210/32 |
| 4,051,026 | 9/1977 | Cremers et al. | 210/38 B |
| 4,100,065 | 7/1978 | Etzel | 210/38 B |
| 4,167,481 | 9/1979 | Cremers et al. | 210/38 B |

*Primary Examiner*—Ivars C. Cintins
*Attorney, Agent, or Firm*—William S. Brown; Donald A. Gardiner

[57] ABSTRACT

A low cost, effective method for removing heavy metal ions from aqueous solution which utilizes a porous, high surface-to-weight ratio siliceous adsorbent comprises the steps of activating the siliceous adsorbent, which is preferably a kaolin clay leach residue, with a basic salt of an alkali metal to incorporate alkali ions into the siliceous adsorbent and contacting the heavy metal ion-containing solution with the activated adsorbent whereby the heavy metal ions exchange with the alkali ions to remove the heavy metal ions from solution. The heavy metal ion loaded adsorbent may be stripped for subsequent reuse or, alternatively, utilized for flux in base metal smelting and the like.

12 Claims, No Drawings

SILICEOUS ADSORBENT FOR HEAVY METALS

DESCRIPTION

1. Technical Field

The present invention relates generally to water purification and specifically to the removal of heavy metal ions from aqueous solutions such as industrial and municipal waste streams.

2. Background Art

The waste water from many industrial processes often contains large quantities of heavy metal ions. The undesirable toxic effects of these substances on aquatic plants and animals are well known. Equally undesirable are the effects these metals have on humans who ingest them as a result of drinking water contaminated by industrial pollutants. Accordingly, removing heavy metal contaminants from water, especially industrial waste water, has received a great deal of attention, particularly since the enactment of the Federal Water Pollution Control Act and similar legislation, which has provided perhaps the primary stimulus for the development of a low cost, effective way of eliminating these toxic heavy metals from industrial waste streams.

Treating water using adsorbents to remove heavy metal ions is well known. In fact, there is a plethora of available adsorbents for treating water containing heavy metal impurities. These adsorbents include ion exchange resins, solvent extractants, natural and synthetic zeolites, activated carbon, organic chelating agents and the like. For example, U.S. Pat. Nos. 3,882,018 to Depree and 4,100,065 to Etzel both disclose methods of removing heavy metal ions from waste water streams by means of adsorbents. The method disclosed by Depree uses an ion exchange resin base material which has been activated with an alkali or alkaline earth salt to provide cations which then exchange with the undesirable heavy metal cations to remove them from the waste water stream. Etzel's method utilizes an ion exchange reaction between cations which are an integral part of a chemically or thermally treated material and the heavy metal ions to remove the heavy metal ions from the water. While these methods have been found to be effective, both present certain disadvantages. Ion exchange resins can be quite costly to use and may not be as effective as desired due to limits in their loading capacity and the presence of interfering ions. In addition, certain waste streams contain impurities which can be destructive to ion exchange resins. Moreover, the base material disclosed in U.S. Pat. No. 4,100,065 requires extensive thermal or chemical processing before it is suitable for use, and such processing adds substantially to the cost of and time needed for removing heavy metal ions from waste water.

DISCLOSURE OF INVENTION

Accordingly, it is an object of the present invention to provide a method whereby heavy metal ions may be removed from aqueous solutions, such as industrial waste water, efficiently, effectively and at low cost.

It is an additional object of the present invention to provide a method of removing heavy metal ions from aqueous solutions which utilizes a low cost, highly porous siliceous material as a substrate for an ion exchange reaction.

Other objects and advantages will become apparent from the following description and appended claims.

In accordance with the aforesaid objectives a method for removing heavy metal ions from aqueous solution is provided comprising the steps of activating fine particles of a highly porous siliceous material with a basic alkali salt and contacting the heavy metal ion-containing solution with the activated siliceous material, whereby heavy metal ions in the aqueous solution are replaced by alkali metal ions with which the siliceous material has been activated. Contact with the activated siliceous material preferably occurs in a bed; however, other forms of contact between the heavy metal containing solution and the activated siliceous material, such as slurrying, are also suitable. The heavy metal ions may be stripped from the siliceous adsorbent material and the adsorbent regenerated for reuse or, alternatively, the loaded adsorbent may be utilized as a fluxing agent in base metal smelting.

BEST MODE FOR CARRYING OUT THE INVENTION

The method of the present invention comprises activating highly porous, finely divided particles of a siliceous adsorbent material with the basic salt of an alkali metal and contacting the activated siliceous adsorbent with a heavy metal ion-containing aqueous solution having a pH in the range from about 2.0 to about 10.0, preferably from about 4.0 to 8.0. The resulting heavy metal ion loaded adsorbent may subsequently be stripped and regenerated for further use or used without further treatment as a fluxing agent.

The process of the present invention preferably utilizes a bed of a siliceous adsorbent material as the base material for an ion exchange reaction to remove heavy metal ions from aqueous solutions. The siliceous adsorbent best suited for use in the process of the present invention should be a high surface-to-weight ratio porous material, having a surface-to-weight ratio of at least 100 square meters per gram. One particularly preferred siliceous adsorbent is the leach residue remaining after the extraction of aluminum from kaolin clay. This kaolin clay leach residue contains at least 90 percent and preferably 98 percent $SiO_2$, is quite porous and has an extremely high surface-to-weight ratio, typically about 325 square meters per gram. Moreover, since this leach residue is generally considered a waste product, it is readily available and very inexpensive. Other highly porous or finely divided siliceous materials, such as diatomaceous earth, fly ash or silica flour and the like, may also be used.

The particle size of the siliceous material is selected to achieve a desired surface-to-weight ratio and/or flow rate of the heavy metal ion-containing water through the adsorbent, if a bed of adsorbent is used. Preferably the adsorbent is disposed in a column so that it forms a bed through which the heavy metal ion-containing solution may pass. When the siliceous adsorbent is so used, effective metal ion removal will occur at a flow rate as high as 50 ml/min/cm$^2$ of the cross-sectional area of the adsorbent bed; however, the best results are obtained at a flow rate from about 10 ml/min/cm$^2$ to 20 ml/min/cm$^2$. Therefore, a wide variety of particle sizes is suitable for use in the adsorbent bed. Adequate removal of metal ions will be obtained with particles of siliceous material ranging in size from about −100 mesh to about 1 mesh. However, a particle size of about −10 mesh is preferred since this will generally allow a desirable rate of flow while providing sufficient surface area for the ion exchange reaction. In addition the −10 mesh particle size may be easily filtered if, instead of utilizing the preferred method of passing the metal ion-containing solution through a bed, the adsorbent is slurried in the aqueous solution to remove the ions.

The siliceous base material by itself is not an effective heavy metal ion adsorbent. Treatment with solutions containing basic salts of alkali metals, preferably sodium or potassium, is necessary to convert the siliceous material to a heavy metal adsorbent. Preferred basic salts for this purpose are NaOH, $Na_2CO_3$, $Na_2SiO_3$, KOH, $K_2CO_3$ and $K_2SiO_3$. This caustic treatment causes the alkali metal cations to be incorporated into the surface layers of the siliceous material. The alkali metal cations are then available for exchange with the heavy metal ions of the aqueous solution from which the heavy metal ions are to be removed. Activation of the siliceous material for ion exchange may be achieved with alkali metal salt concentrations in the range of about 0.01 M to about 1.0 M, and preferably in the range of about 0.05 M to 0.5 M. Optimum results are achieved at a preferred basic salt concentration of about 0.2 M.

The temperature at which the heavy metal ions are removed from solution by the present process is not critical. In most instances it is anticipated that the process will be carried out at a temperature between room temperature (about 20° to 25° C.) and about 100° C.

The process of the present invention will find widespread use in scavenging heavy metal ions from many types of aqueous solutions, including mine drainage and industrial waste streams, and the pH of these solutions is likely to vary quite a bit. Effective heavy metal ion removal utilizing the siliceous adsorbents as described herein can be achieved for aqueous solutions having a pH in the range from about 2.0 to about 10.0 and preferably from about 4.0 to about 8.0. However, the ion exchange reaction of the process disclosed herein is the most effective at a pH from about 5.0 to about 7.0. Since most mine drainage, industrial waste water and other aqueous solutions from which it is desired to remove heavy metals are likely to have a pH within a suitable range, pH adjustment of the solution to be treated should not be necessary. Should pH adjustment be necessary, any conventional means of achieving the optimum pH may be employed.

Preferably, a bed of the siliceous adsorbent is placed in conventional water purification equipment, such as an ion exchange column, so that the activating basic alkali metal salt and the heavy metal ion-containing solution to be purified may be readily passed through the siliceous adsorbent bed. As the heavy metal ion containing solution is passed through the activated adsorbent bed, the sodium or potassium ions on the adsorbent exchange with the heavy metal ions in the solution. This reaction continues until the supply of sodium or potassium ions is exhausted. The resulting purified solution contains an increased sodium or potassium ion concentration and a decreased heavy metal concentration. If the aqueous solution has a very high heavy metal concentration prior to purification, it may be necessary to pass it through additional activated siliceous adsorbent to assure that the level of any heavy metal ions remaining in the purified solution is within acceptable limits.

After the undesirable heavy metal ions have been removed from solution, the loaded adsorbent may be either stripped and regenerated or used as a metal bearing flux for smelting and the like. The heavy metal ions may be rapidly and efficiently stripped from the loaded adsorbent by any one of a number of substances, all of which are known to those skilled in the art. Mineral acids, sodium cyanide and metal complexing agents like EDTA have all been found to be effective in stripping heavy metals from the siliceous adsorbents of the present invention. The preferred mineral acid concentration for this purpose is about 0.05 M to about 2.0 M, with 0.2 M being optimum; however, acceptable results may be obtained by any mineral acid concentration that produces an effluent having a pH up to about 4.0. The di-, tri- or tetra- sodium salts of EDTA (ethylenediaminetetraacetate) have all been found to be effective in stripping heavy metal ions from siliceous adsorbent materials. Although any concentration of these forms of EDTA soluble in water can be used, the most rapid and efficient stripping takes place when an EDTA concentration of about 0.5 M to 2.0 M or the saturation concentration is used. The stripped adsorbent may then be regenerated by contacting it with a basic alkali metal salt solution in the preferred manner described. Passing the regenerant through the column until the effluent reaches a pH in the range from about 9.0 to about 12.0 insures that optimum regeneration of the siliceous adsorbent has been achieved.

As an alternative to stripping and regenerating the adsorbent for reuse, the heavy metal-containing siliceous adsorbent could be used as a flux in base metal smelting. When the loaded siliceous adsorbents are fed as fluxing agents to base metal smelters, the adsorbed metal values may then subsequently be recovered. This alternative presents a great advantage which is not available with non-siliceous adsorbents which must be discarded if they cannot be reused. If these heavy metal-containing non-siliceous adsorbents cannot be reused, they must be discarded and their disposal presents similar toxicity problems to the problem originally confronted, i.e., the safe disposal of heavy metal ion containing aqueous solutions.

The following Examples are intended to be illustrative of the present invention and are not intended to limit its scope in any way.

EXAMPLE I 200 grams of −10 mesh kaolin leach residue having a surface-to-weight ratio of 325 $m^2/g$ was placed in a 1.5 inch diameter column. 400 ml of 0.1 M $Na_2SiO_3$ solution was passed through the residue in the column to activate the residue with sodium ions and the treated residue was then washed with 3,000 ml of water. After the washing step, 6,000 ml of 0.01 M $CuSO_4$ solution at a pH of 5.0 was passed through the column. One pass through the column reduced the copper concentration from 640 mg Cu per liter to 0.05 mg Cu per liter. A total of 48 millimoles of copper was loaded on the adsorbent. The adsorbent in the column was then stripped with 500 ml of 0.2 M $H_2SO_4$ and rinsed with 2,000 ml of water. Regeneration and reactivation of the adsorbent was achieved by passing 473 ml of 1.0 M NaOH solution through the column. 3,000 ml of 0.02 M $CuSO_4$ solution was then passed through the reloaded adsorbent with the result that a total of 52 millimoles of copper was retained by the adsorbent.

EXAMPLE II

A charge of 16.7 grams of −10 mesh kaolin leach residue was placed in a 0.4 inch diameter glass column.

0.20 M NaOH solution was passed through the residue in the column until the pH of the effluent exceeded 10. This activated the residue with sodium ions. After this pH had been reached, 2,000 ml of a pH 5.0 solution containing 1.0 millimolar concentrations each of $CuSO_4$, $NiSO_4$, $Pb(NO_3)_2$, $ZnSO_4$ and $Cd(NO_3)_2$ was fed through the activated adsorbent at a rate of about 10 to 20 ml/min. The concentration of each metal in the effluent solution was 0.03 millimolar or less before the adsorbent became saturated, indicating that the capacity of the adsorbent was 0.63 meq/gm of adsorbent. An analysis of the metals loaded on the adsorbent showed the following percentages of metals were removed from the original solution: 94% Cu, 97% Ni, 98% Pb, 92% Zn, 95% Mn and 93% Cd. The loaded column was then stripped of 90% of the adsorbed metal values by passing 250 ml of 0.2 M $Na_2H_2EDTA$ solution through it.

INDUSTRIAL APPLICABILITY

The method of the present invention can be used to remove metal ions from any aqueous solution having a pH in the range from about 2.0 to about 10.0. It is well suited to scavenging heavy metal impurities from industrial, municipal and private waste water discharges. However, the present process will find its primary application in the removal and recovery of toxic heavy metal ions from mining and metallurgical process waters. For example, the waste water resulting from the process by which aluminum is extracted from kaolin clay can be efficiently and economically treated by the process of the present invention to remove toxic heavy metal impurities so that the treated waste water may be discharged without contaminating drinking water or harming aquatic plant and animal life. Moreover, the process of the present invention permits effective recovery of valuable heavy metals.

We claim:

1. A method for removing heavy metal ions from aqueous solution comprising the steps of:
   (a) activating a high surface-to-weight ratio, porous siliceous adsorbent material, from the group consisting of kaolin leach residue, diatomaceous earth, fly ash and silica flour, with alkali metal ions by contacting said siliceous adsorbent material with an aqueous solution of the basic salt of an alkali metal; and
   (b) contacting said activated siliceous adsorbent material with said heavy metal ion-containing aqueous solution; whereby said heavy metal ions exchange with said alkali metal ions to decrease the concentration of heavy metal ions in said heavy metal ion-containing aqueous solution.

2. A method as claimed in claim 1, wherein said heavy metal ion containing aqueous solution has a pH in the range from about 2.0 to about 10.0.

3. A method as claimed in claims 1 or 2, wherein said alkali metal is selected from the group consisting of sodium and potassium.

4. A method as claimed in claim 3, wherein said basic salt of said alkali metal is selected from the group consisting of NaOH, $Na_2CO_3$, $Na_2SiO_3$, KOH, $K_2CO_3$, and $K_2SiO_3$.

5. A method as claimed in claim 4, wherein said heavy metal ions are stripped from said siliceous adsorbent by a chemical stripping agent selected from the group consisting of mineral acids, sodium cyanide and the sodium salts of ethylenediaminetetraacetic acid.

6. A method as claimed in claim 5, wherein said alkali metal is selected from the group consisting of sodium and potassium.

7. A method as claimed in claims 1 or 2, wherein said siliceous adsorbent includes at least 90 percent $SiO_2$.

8. A method as claimed in claims 1 or 2, wherein said siliceous adsorbent includes at least 98 percent $SiO_2$.

9. A method as claimed in claims 1 or 2, wherein said siliceous adsorbent is the kaolin leach residue remaining after the extraction of aluminum from kaolin clay.

10. A method as claimed in claims 1 or 2, further including the steps of stripping said heavy metal ions from said siliceous adsorbent and regenerating said stripped siliceous adsorbent by contacting said stripped siliceous adsorbent with an aqueous solution of the basic salt of an alkali metal.

11. A method as claimed in claims 1 or 2, wherein said siliceous adsorbent material has a surface-to-weight ratio of at least about 100 square meters per gram.

12. A method as claimed in claim 11, wherein said siliceous adsorbent is the kaolin leach residue remaining after the extraction of aluminum from kaolin clay.

* * * * *